(12) United States Patent
Cheon et al.

(10) Patent No.: US 7,985,499 B2
(45) Date of Patent: Jul. 26, 2011

(54) BATTERY HAVING ELECTRODE LEAD ELEMENT WITH FIXING MEMBER

(75) Inventors: Sang-Eun Cheon, Suwon-si (KR); Hye-Won Yoon, Suwon-si (KR); Jae-Kyung Kim, Suwon-si (KR); Seok-Yoon Yoo, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1183 days.

(21) Appl. No.: 11/480,390

(22) Filed: Jul. 5, 2006

(65) Prior Publication Data
US 2007/0009792 A1  Jan. 11, 2007

(30) Foreign Application Priority Data
Jul. 5, 2005 (KR) .................. 10-2005-0060119

(51) Int. Cl.
*H01M 2/14* (2006.01)
*H01M 2/18* (2006.01)
*H01M 2/26* (2006.01)
*H01M 2/28* (2006.01)

(52) U.S. Cl. ......... 429/161; 429/129; 429/130; 429/131

(58) Field of Classification Search ........... 429/129–131
See application file for complete search history.

(56) References Cited

FOREIGN PATENT DOCUMENTS

| JP | 2000-040501 | * | 2/2000 |
|---|---|---|---|
| JP | 2000-150306 |   | 5/2000 |
| JP | 2001-038475 | * | 2/2001 |
| JP | 2005-032477 |   | 2/2005 |
| KR | 10-2006-0060806 A |   | 6/2006 |

* cited by examiner

*Primary Examiner* — Dah-Wei D Yuan
*Assistant Examiner* — Steven Scully
(74) *Attorney, Agent, or Firm* — Lee & Morse, P.C.

(57) ABSTRACT

A battery including an electrode assembly including first and second electrodes, a lead element electrically connected to the first electrode, and an external terminal electrically connected to the lead element, wherein the lead element includes a fixing member configured to hold the lead element against the first electrode.

15 Claims, 4 Drawing Sheets

BATTERY HAVING ELECTRODE LEAD ELEMENT WITH FIXING MEMBER

BACKGROUND OF THE INVENTION

1. Field of the Invention

The present invention relates to a battery. More particularly, the present invention relates to a battery suitable for use as a rechargeable battery, the battery including a lead element for collecting current generated by an electrode assembly.

2. Description of the Related Art

Generally, batteries include single use, or non-rechargeable, and secondary, or rechargeable, batteries. Typical rechargeable batteries may be discharged and recharged multiple times, whereas single-use batteries are typically disposed of after an initial discharge.

Batteries may be fabricated in a variety of sizes. Small batteries may be formed of a unit battery cell, or of a plurality of unit battery cells configured as a battery pack, and may be used as power sources for various portable electronic devices, e.g., cellular phones, laptop computers, camcorders, etc. Larger batteries may be formed of multiple interconnected batteries, e.g., packs of several to tens of unit battery cells connected together, and may be used to power motors and motor-driven machines such as electric vehicles (EVs), hybrid electric vehicles (HEVs), etc.

Rechargeable batteries may be classified according to their form factor, e.g., cylindrical, prismatic or rectangular, etc. Rechargeable batteries may include an electrode assembly that is formed by winding positive and negative electrode sheets with an interposed separator that serves as an insulator. In other cases, the battery may include multi-layered stacked positive and negative electrodes with an insulating separator in between. The electrode assembly may be inserted into a case that is closed with a cap assembly having external terminals protruding therefrom, for electrical connection to the apparatus to be powered.

Where the positive and negative electrodes and the separator are spirally wound in an electrode assembly, leads may be attached to the electrode assembly to collect current generated by the positive and negative electrodes. The leads may be connected to the external terminals in order to deliver electrical current generated by the positive and negative electrodes to the outside of the case.

Rechargeable batteries with high energy density that employ a non-aqueous electrolyte have recently been developed as high power rechargeable batteries. Very large-capacity batteries, e.g., those used for EVs and HEVs, may have bigger positive and negative electrodes in order to accommodate large current flows. In order to reduce the internal resistance of the battery, these batteries may have leads with an additional tab to maximize a current collecting area at the interface between the electrodes and the leads. However, such leads may be difficult to weld to the electrodes, and it may be difficult to keep the tab properly aligned with respect to the electrodes during manufacturing.

For example, the battery may be assembled by welding the tab to an uncoated or exposed region of the respective electrode, i.e., to a portion of the respective positive or negative electrode that extends from the electrode assembly. The welding process may involve the application of pressure to the electrode assembly, and such pressure may disturb the alignment of the tab before it is fixed in place by the welding. Even when the tab is correctly inserted in the first instance, it may be displaced due to the pressure applied for welding, causing an alignment problem between the tab and the exposed region of the respective electrode. Weld and alignment problems such as these may result in difficulty assembling the batteries, defective batteries, reduced performance characteristics of the finished batteries, etc.

One way to address the problems that arise during welding is to fix the tab in place by attaching tape between the tab and the exposed region of the electrode, i.e., after the tab is inserted into the exposed region and before welding. However, such an approach adds time and effort to the manufacturing process, thus decreasing productivity.

SUMMARY OF THE INVENTION

The present invention is therefore directed to a battery, which substantially overcomes one or more of the problems due to the limitations and disadvantages of the related art.

It is therefore a feature of an embodiment of the present invention to provide a battery including a lead element having a fixing member that is configured to temporarily fix the lead element to an electrode.

It is therefore another feature of an embodiment of the present invention to provide a battery including a lead element that is configured to enhance the productivity and reliability of the battery manufacturing process.

It is therefore a further feature of an embodiment of the present invention to provide a battery including a lead element that is configured to maintain alignment with an electrode during assembly of the battery.

At least one of the above and other features and advantages of the present invention may be realized by providing a battery including an electrode assembly including first and second electrodes, a lead element electrically connected to the first electrode, and an external terminal electrically connected to the lead element, wherein the lead element includes a fixing member configured to hold the lead element against the first electrode.

The first electrode may have an active material coated on a first region, and the lead element may be disposed against an uncoated second region of the first electrode. The fixing member may penetrate the uncoated second region of the first electrode. The first electrode may be wound, the electrode assembly may define a space within the wound first electrode, the lead element may be partially disposed within the space, and the fixing member may extend from a portion of the lead element that is disposed within the space.

The fixing member may include a protrusion that is configured to be pressed into the first electrode. The protrusion may have a tapered end. The first electrode may be wound into a plurality of layers, and the fixing member may penetrate at least one of the plurality of layers.

The battery may further include a second lead element electrically connected to the second electrode, the second lead element including a second fixing member configured to hold the second lead element against the second electrode.

The lead element may include a junction portion inserted into a space within the electrode assembly, and a connection portion integrally formed with the junction portion, extending beyond the electrode assembly and connected to the external terminal, wherein the fixing member may be disposed on the junction portion. The fixing member may be disposed adjacent to a side of the junction portion that faces a center of the space. The external terminal may be integrally formed with the connection portion. The fixing member may be disposed at an upper end of the junction portion.

The battery may further include a case housing the electrode assembly and a cap assembly closing an opening of the case, wherein the fixing member may extend from the lead element towards the cap assembly. The battery may be a rechargeable prismatic battery.

At least one of the above and other features and advantages of the present invention may also be realized by providing a battery, including an electrode assembly having a winding of first and second electrodes that defines an inner space, and a lead element disposed partially within the inner space, wherein the lead element includes an engaging element for temporarily attaching the lead element to the first electrode.

The engaging element may extend from a surface of the lead element that is within the inner space. The battery may further include a welded portion that permanently attaches the lead element to the first electrode.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF THE INVENTION

Figure 1:
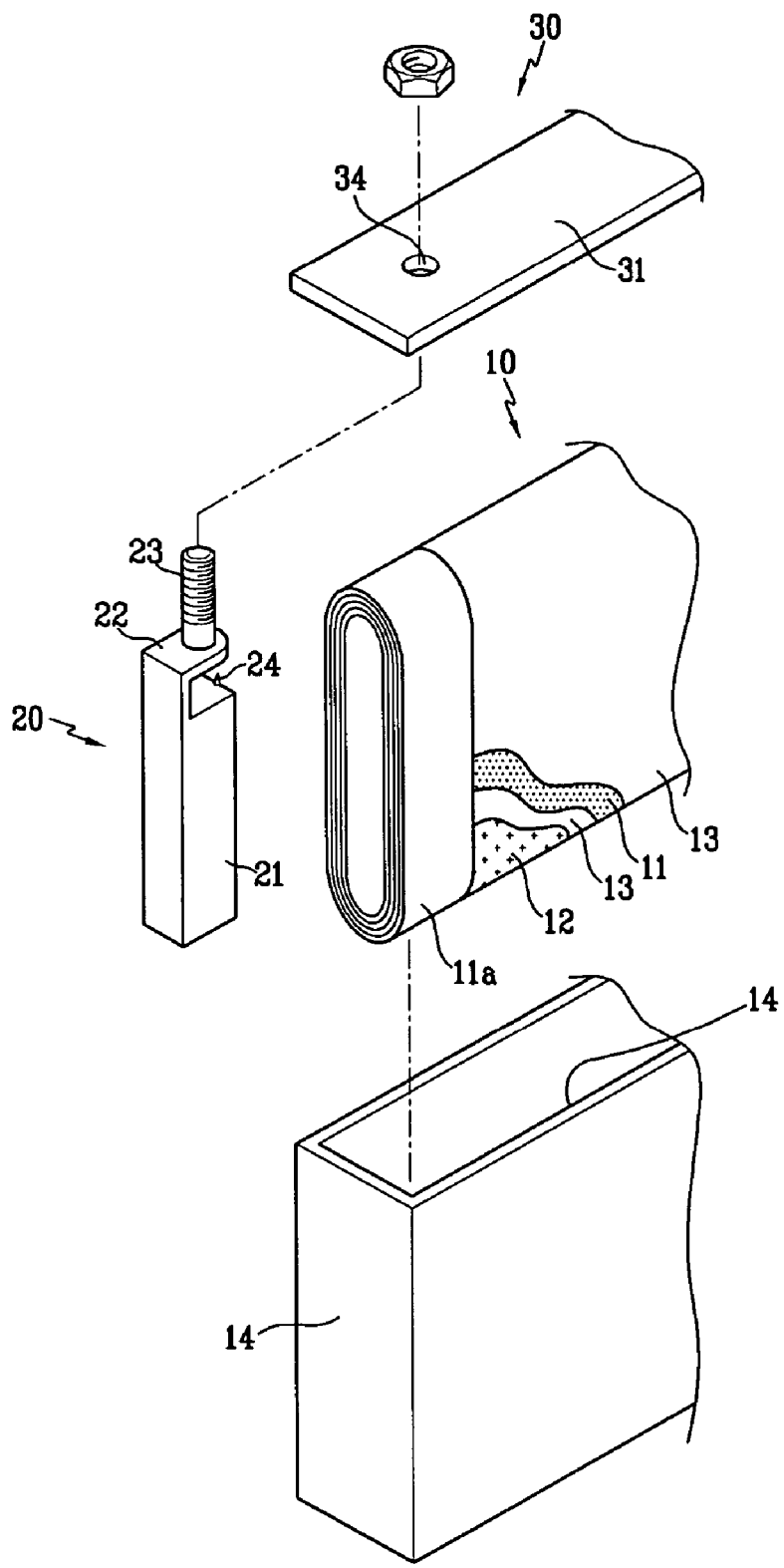
FIG. 1 illustrates a partial exploded perspective view of a battery according to an embodiment of the present invention.

Korean Patent Application No. 10-2005-0060119, filed on Jul. 5, 2005, in the Korean Intellectual Property Office, and entitled "Rechargeable Battery," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A battery according to embodiments of the present invention may include a lead element configured to positively engage with a corresponding region of an electrode assembly, e.g., an uncoated region of a positive or negative electrode. According to an embodiment of the present invention, the lead element may include a fixing member, e.g., a protrusion, that can temporarily fix the lead element to the uncoated region during a bonding process, whereby the lead element is permanently attached to the uncoated region during fabrication of the battery.

Once the lead element is bonded, e.g., welded, to the uncoated region of the electrode assembly, the protrusion may help prevent the lead element from being detached or separating from the uncoated region of the electrode assembly, enabling a more durable bond in order to reliably carry current generated in the electrode assembly to an external terminal, and, accordingly, enhancing battery performance and/or lifetime.

A battery according to embodiments of the present invention may be suitable for use as a rechargeable battery such as those used to power motors of high-draw machines, e.g., HEVs, EVs, cordless cleaners, electric motorbikes and scooters, etc.

Figure 2:
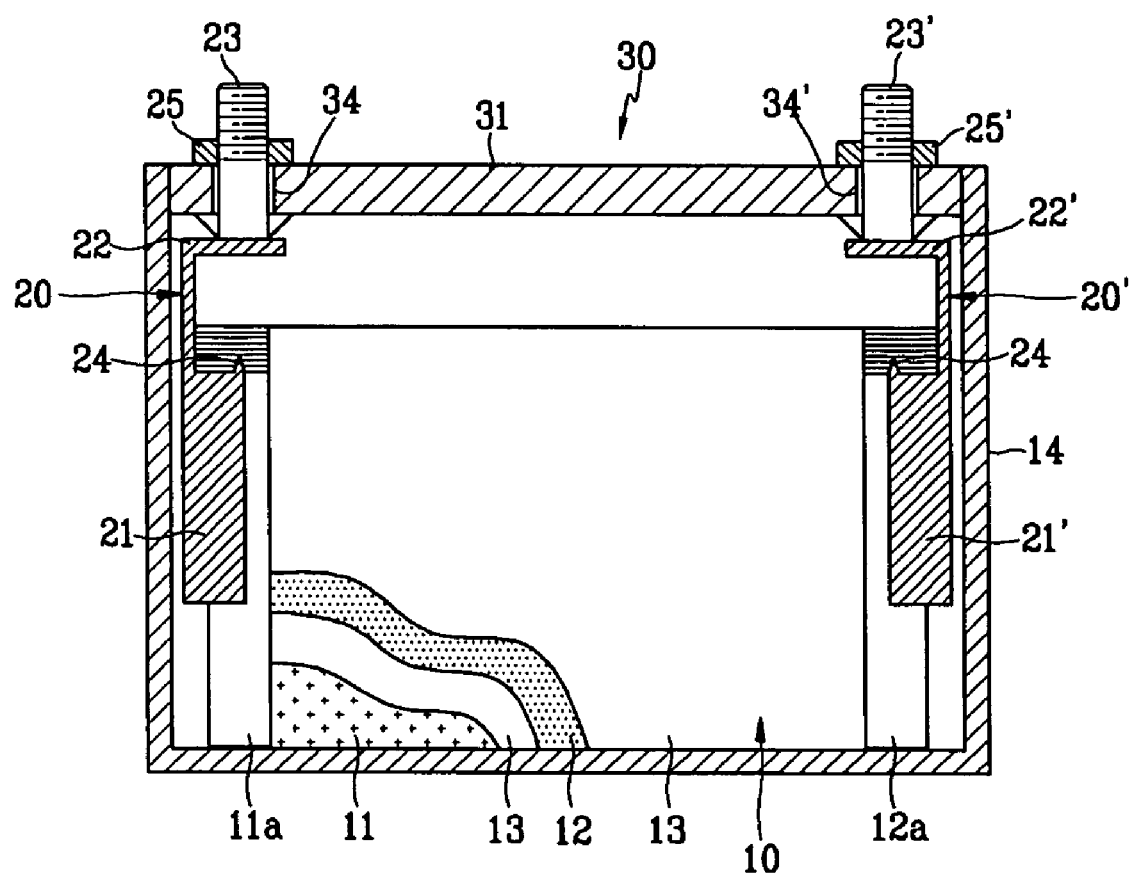
FIG. 2 illustrates an assembled cross-sectional view of the battery of FIG. 1.

FIG. 1 illustrates a partial exploded perspective view of a battery according to an embodiment of the present invention, and FIG. 2 illustrates an assembled cross-sectional view of the battery of FIG. 1. Referring to FIG. 1, the battery may include an electrode assembly 10 housed in a case 14. The electrode assembly 10 may include a positive electrode 11, a negative electrode 12 and a separator 13. The electrode assembly 10 may be formed by, e.g., stacking sheet-shaped positive and negative electrodes 11 and 12 with the separator 13 interposed therebetween and spirally winding them into a jelly-roll. That is, the electrode assembly 10 may be formed by coating sheet-shaped current collectors with the corresponding active material, disposing the separator 13 between the current collectors, and spirally winding and pressing them together to correspond to the shape of the case 14. The positive and negative electrodes 11 and 12 may be electrically separated by the separator 13, and may have positive and negative uncoated regions 11a and 12a, respectively.

The positive and negative uncoated regions 11a and 12a may be exposed at opposite sides of the electrode assembly 10. That is, the positive and negative uncoated regions 11a and 12a may be opposed to each other at both ends of an electrode assembly 10. When the electrode assembly 10 is inserted into the case 14, and housed therein with a cap assembly 30 on top, the uncoated regions 11a and 12a may be positioned at both sides of the case 14.

The case 14 may be, e.g., a prismatic case or other suitable shape. The case 14 may have an opening 14a at one end, and may define a space for housing the electrode assembly 10. The case 14 may be formed of, e.g., a conductive metal such as aluminum, an aluminum alloy, nickel-plated steel, etc.

The battery may also include one or more lead elements 20, 20'. In the figures, two lead elements, 20 and 20', are illustrated. The two lead elements may be, e.g., a positive lead element 20 and a negative lead element 20', although it will be understood that positive and negative may be reversed, or that only one lead element may be employed. In the description that follows, the positive and negative lead elements 20 and 20' may have substantially similar structures and may function similarly. Therefore, for simplicity, the positive lead element 20 will be described in detail below, and the negative lead element 20' will be described only as necessary.

The positive lead element 20 may be inserted into the electrode assembly 10, and may be welded to an uncoated region of the electrode assembly 10, e.g., an uncoated region 11a of the positive electrode 11. In an implementation, the positive and negative electrodes 11 and 12 may be formed with the same shape. Accordingly, the corresponding lead elements 20, connected to the positive and negative uncoated regions 11a and 12a, may also have the same shape. That is, two such lead elements 20 may be respectively provided at the uncoated region 11a of the positive electrode 11 and at the uncoated region 12a of the negative electrode 12 (see FIG. 2). Only the positive electrode 11 is illustrated in detail in FIG. 1, for simplicity.

The positive lead element 20 may have a terminal 23, i.e., an external terminal, at one end thereof. That is, the positive lead element 20 may electrically connect the positive uncoated region 11a with the external terminal 23, i.e., a positive external terminal, so as to electrically couple the external terminal 23 to the positive electrode 11. The cap assembly 30 may close the opening 14a of the case 14, and may be mounted with the terminal 23 penetrating therethrough. The cap assembly 30 may include a cap plate 31 having holes 34 and 34' through which positive and negative external terminals 23 and 23' can be mounted. The cap plate 31 may be fixed in the opening 14a of a case 14 to seal it in an air-tight and/or liquid-tight manner.

Referring to FIG. 2, each uncoated region 11a and 12a of the positive and negative electrodes 11 and 12, respectively, in the electrode assembly 10 may be connected with respective lead elements 20 and 20'. Each lead element 20 and 20' may be inserted into positive and negative uncoated regions 11a and 12a, respectively, and bonded thereto, e.g., by welding. The positive lead element 20 may include a junction portion 21 and a connection portion 22 that extends from the top of the junction portion 21. Similarly, the negative lead element 20' may include a junction portion 21' and a connection portion 22' that extends from the top of the junction portion 21'. The junction portions 21 and 21' may be inserted into the respective interiors of the uncoated regions 11a, 12a of the wound positive and negative electrodes 11 and 12.

The connection portions 22 and 22' may be integrally formed with the junction portions 21 and 21'. The respective positive and negative external terminals 23 and 23' may likewise be integrally formed with the connection portions 22 and 22', or may be separately formed and attached thereto. The positive and negative external terminals 23 and 23' may be threaded along part of their external circumferences, in order to receive binding nuts 25 and 25'.

Figure 3:
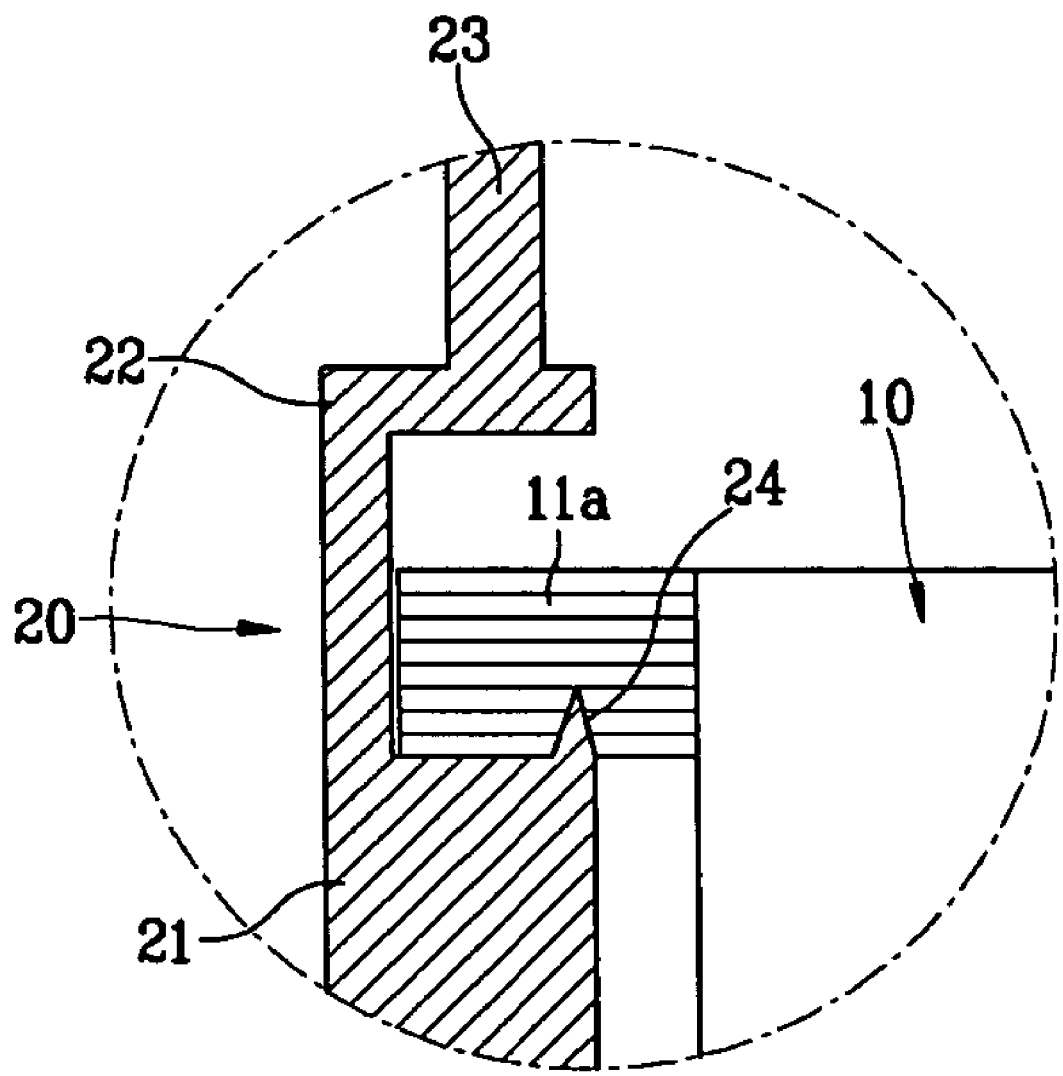
FIG. 3 illustrates a partial enlarged view of the battery of FIG. 2.
Figure 4:
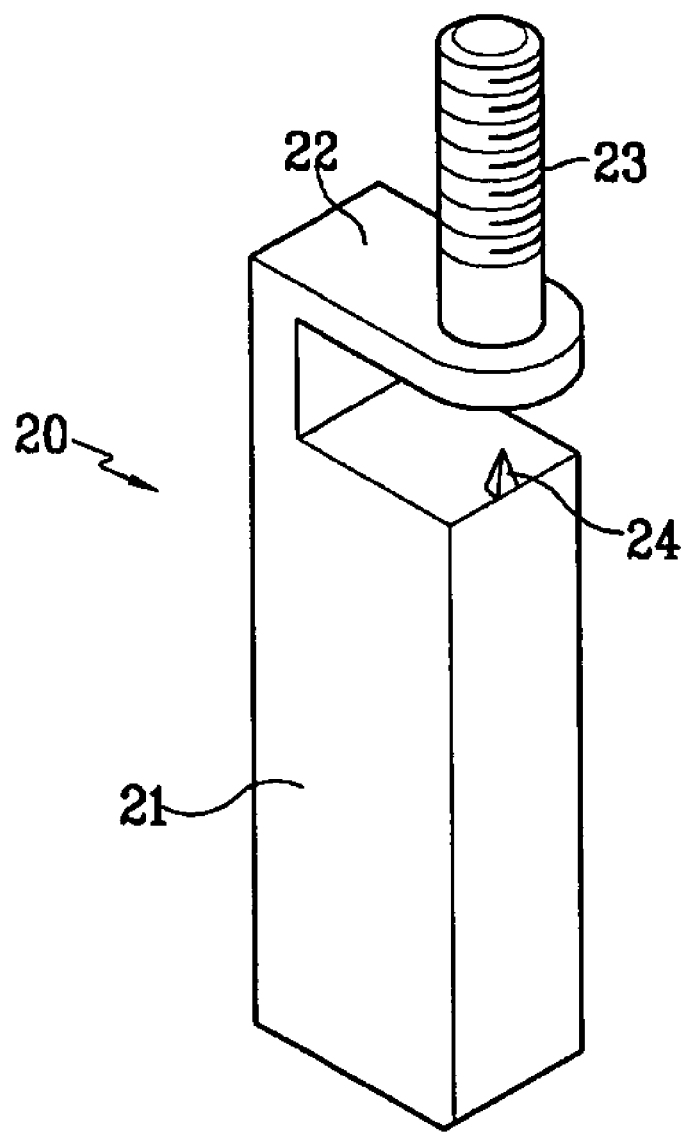
FIG. 4 illustrates a perspective view of a lead element according to an embodiment of the present invention.

FIG. 3 illustrates a partial enlarged view of the battery of FIG. 2, and FIG. 4 illustrates a perspective view of a lead element according to an embodiment of the present invention. The positive lead element 20 may include the junction portion 21 and the connection portion 22, as described above. The junction portion 21 may be inserted into the center of the positive uncoated region 11a and fixed thereto, e.g., by welding. The connection portion 22 may be integrally combined with the junction portion 21, may extend past an outer end of the positive uncoated region 11a up to the upper part of the electrode assembly 10, and may be integrally combined with a positive external terminal 23.

The junction portion 21 may be formed to have dimensions that are long enough and thick enough to be inserted into the positive uncoated region 11a. The connection portion 22 may extend beyond the external end of the positive uncoated region 11a up to the upper part of the electrode assembly 10. The connection portion 22 may have a right angle bend and may be disposed with a positive external terminal 23 extending from the top thereof.

The junction portion 21 may have a protrusion 24, e.g., a pointed or needle-like protrusion, that is configured to be pushed into the positive uncoated region 11a. Pushing the protrusion 24 into the positive uncoated region 11a may fix the location of the positive lead element 20 relative to the electrode assembly 10, e.g., at the upper part of the electrode assembly 10 (see FIG. 2). There may be one or more protrusions 24 at the upper end of the junction portion 21. Note that the present invention is not limited to the illustrated configuration, and there is no particular limit as to the number, location, height, shape, etc., of the protrusion 24. For example, the protrusion 24 may taper to a point in the form of a wedge or a cone, more than one protrusion 24 may be provided, etc.

FIG. 3 shows how the protrusion 24 may be pressed into the positive uncoated region 11a. The junction portion 21 of the positive lead element 20 may be inserted into interior of the uncoated region 11a of the wound positive electrode 11 and stuck to the inside thereof by the protrusion 24. That is, if the positive lead element 20 is pushed up into the inside of the positive uncoated region 11a, the protrusion 24 may contact the positive uncoated region 11a and may be inserted therein using pressure, in order to fix it thereto. The positive electrode 11 may be formed of a thin plate, and, accordingly, the protrusion 24 may be easily pressed through the positive uncoated region 11a of the positive electrode 11. The protrusion 24 may penetrate one or more layers of the positive electrode 11. When the protrusion 24 is stuck to the positive uncoated region 11a and fixed therewith, it may facilitate fixing the positive lead element 20 to the positive uncoated region 11a in a subsequent bonding process, e.g., a welding process.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery, comprising:
an electrode assembly including first and second electrodes;
a lead element electrically connected to the first electrode; and
an external terminal electrically connected to the lead element, wherein:
the lead element includes a fixing member configured to hold the lead element against the first electrode,
the first electrode includes a plurality of layers, and
the fixing member supports an internal side of an uncoated region of the first electrode and includes a protrusion inserted inside at least one layer of the first electrode in the uncoated region of the first electrode to penetrate the at least one layer, the protrusion extending in a direction facing the external terminal.

2. The battery as claimed in claim 1, wherein:
the uncoated region is a second region,
the first electrode has an active material coated on a first region, and
the lead element is disposed against the uncoated second region of the first electrode.

3. The battery as claimed in claim 1, wherein:
the first and second electrodes are wound into a wound structure with an inwardly facing wall surrounding and defining a space therewithin,
the lead element is partially disposed within the space, and
the protrusion extends from a portion of the lead element that is disposed within the space.

4. The battery as claimed in claim 1, wherein the protrusion is configured to be pressed inside the at least one layer of the first electrode in the uncoated region of the first electrode, such that the at least one layer is discontinuous in an area surrounding the protrusion.

5. The battery as claimed in claim 4, wherein the protrusion has a tapered end.

6. The battery as claimed in claim 1, wherein the first electrode is wound into the plurality of layers.

7. The battery as claimed in claim 1, further comprising a second lead element electrically connected to the second electrode, the second lead element including a second fixing member configured to hold the second lead element against the second electrode.

8. The battery as claimed in claim 1, wherein the lead element further comprises:
- a junction portion inserted into a space defined by an inner wall of the electrode assembly, the junction portion extending in the direction facing the external terminal; and
- a connection portion integrally formed with the junction portion, extending beyond the electrode assembly and connected to the external terminal, wherein the fixing member is disposed on the junction portion.

9. The battery as claimed in claim 8, wherein the fixing member is disposed adjacent to a side of the junction portion that faces a center of the space.

10. The battery as claimed in claim 8, wherein the external terminal is integrally formed with the connection portion.

11. The battery as claimed in claim 8, wherein the fixing member is disposed at an upper end of the junction portion.

12. The battery as claimed in claim 1, further comprising a case housing the electrode assembly and a cap assembly closing an opening of the case, wherein the fixing member extends from the lead element towards the cap assembly.

13. The battery as claimed in claim 12, wherein the battery is a rechargeable prismatic battery.

14. The battery as claimed in claim 3, wherein the at least one layer of the first electrode in the uncoated region of the first electrode has the protrusion inserted inside the inwardly facing wall of the wound structure.

15. The battery as claimed in claim 1, wherein the protrusion extends through the at least one layer of the first electrode in the uncoated region.

* * * * *